US011548828B2

(12) United States Patent
Sato et al.

(10) Patent No.: US 11,548,828 B2
(45) Date of Patent: Jan. 10, 2023

(54) CERAMIC MATRIX COMPOSITE AND METHOD OF MANUFACTURING THE SAME

(71) Applicant: IHI Corporation, Koto-ku (JP)

(72) Inventors: Akihiro Sato, Tokyo (JP); Shingo Kanazawa, Tokyo (JP); Yuuya Nagami, Tokyo (JP); Ryoji Kakiuchi, Tokyo (JP)

(73) Assignee: IHI Corporation, Koto-ku (JP)

( * ) Notice: Subject to any disclaimer, the term of this patent is extended or adjusted under 35 U.S.C. 154(b) by 1087 days.

(21) Appl. No.: 16/196,179

(22) Filed: Nov. 20, 2018

(65) Prior Publication Data

US 2020/0024198 A1 Jan. 23, 2020

Related U.S. Application Data

(63) Continuation of application No. PCT/JP2017/015243, filed on Apr. 14, 2017.

(30) Foreign Application Priority Data

Aug. 25, 2016 (JP) .............................. JP2016-164731

(51) Int. Cl.
*C04B 35/565* (2006.01)
*C04B 35/628* (2006.01)
(Continued)

(52) U.S. Cl.
CPC ...... *C04B 35/565* (2013.01); *C04B 35/62863* (2013.01); *C04B 35/657* (2013.01);
(Continued)

(58) Field of Classification Search
CPC ............ C04B 35/565; C04B 35/62863; C04B 35/657; C04B 35/80; C04B 2235/3826;
(Continued)

(56) References Cited

U.S. PATENT DOCUMENTS 5,296,311 A * 3/1994 McMurtry ........ C04B 35/62857
428/688
5,840,221 A * 11/1998 Lau .................... C04B 35/62897
264/29.7

(Continued)

FOREIGN PATENT DOCUMENTS

JP 7-223876 8/1995
JP 10-59780 3/1998
(Continued)

OTHER PUBLICATIONS

Extended European Search Report dated Feb. 26, 2020 in Patent Application No. 17843107.8, 11 pages.
(Continued)

*Primary Examiner* — Noah S Wiese
(74) *Attorney, Agent, or Firm* — Oblon, McClelland, Maier & Neustadt, L.L.P.

(57) ABSTRACT

A ceramic matrix composite includes a substrate which contains a fibrous body made of silicon carbide fiber, and a matrix which is formed in the substrate, and which contains silicon carbide and a silicon material made of silicon or a binary silicon alloy.

11 Claims, 5 Drawing Sheets

(51) Int. Cl.
*C04B 35/657* (2006.01)
*C04B 35/80* (2006.01)

(52) U.S. Cl.
CPC ...... *C04B 35/80* (2013.01); *C04B 2235/3826* (2013.01); *C04B 2235/40* (2013.01); *C04B 2235/428* (2013.01); *C04B 2235/5244* (2013.01); *C04B 2235/616* (2013.01)

(58) Field of Classification Search
CPC .......... C04B 2235/40; C04B 2235/428; C04B 2235/5244; C04B 2235/616
See application file for complete search history.

(56) References Cited

U.S. PATENT DOCUMENTS

| | | | |
|---|---|---|---|
| 5,876,659 | A | 3/1999 | Yasutomi et al. |
| 7,736,554 | B2* | 6/2010 | Thebault ............... C04B 35/573 427/249.4 |
| 2003/0012938 | A1 | 1/2003 | Bauer et al. |
| 2005/0244581 | A1* | 11/2005 | Thebault ............... C04B 37/006 264/156 |
| 2010/0331166 | A1 | 12/2010 | Hidaka et al. |
| 2013/0184141 | A1 | 7/2013 | Ogasawara et al. |
| 2013/0287941 | A1 | 10/2013 | Gray |
| 2014/0271161 | A1* | 9/2014 | Lazur ............... C04B 35/62868 428/221 |
| 2016/0145158 | A1 | 5/2016 | Ogasawara et al. |
| 2016/0159698 | A1* | 6/2016 | Landwehr ............... C04B 35/65 264/643 |

FOREIGN PATENT DOCUMENTS

| | | |
|---|---|---|
| JP | 10-167831 | 6/1998 |
| JP | 2002-293673 | 10/2002 |
| JP | 2003-146769 | 5/2003 |
| JP | 2005-320236 | 11/2005 |
| JP | 2011-11922 | 1/2011 |
| JP | 2013-147366 | 8/2013 |
| JP | 2013-241327 A | 12/2013 |
| JP | 2016-150873 A | 8/2016 |
| WO | WO 2015/011371 A1 | 1/2015 |
| WO | WO 2017/140986 A1 | 8/2017 |

OTHER PUBLICATIONS

International Search Report dated Jul. 4, 2017 in PCT/JP2017/015243, filed on Apr. 14, 2017(with English Translation).
Written Opinion dated Jul. 4, 2017 in PCT/JP2017/015243, filed on Apr. 14, 2017.
Aoki, T. "Material Development in JAXA (12) Prototype Production and Assessment of SiC/SiC Composite Material by Melt-Infiltration of Si Alloy," Engineering materials, vol. 62, No. 7 , ISSN:0452-2834, 7 pages, Jul. 2014 (with partial English translation).
Japanese Office Action dated Sep. 10, 2019 in Patent Application No. 2018-536053.
European Office Action dated Apr. 28, 2022 in European Patent Application No. 17843107.8, 8 pages.
A. Marchais, et al., "Capillary infiltration of hexadecane in packed SiC powder and in SiC/SiC preforms: Pore description and calculation of molten Si infiltration," Ceramics International, vol. 42, XP029461743, 2016, pp. 7774-7780.

* cited by examiner

CERAMIC MATRIX COMPOSITE AND METHOD OF MANUFACTURING THE SAME

CROSS REFERENCE TO RELATED APPLICATIONS

This application is a continuation application of International Application No. PCT/JP2017/015243, filed on Apr. 14, 2017, which claims priority to Japanese Patent Application No. 2016-164731, filed on Aug. 25, 2016, the entire contents of which are incorporated by references herein.

BACKGROUND

1. Field

The present disclosure relates to a ceramic matrix composite and a method of manufacturing the same.

2. Description of the Related Art

As high-temperature materials for aircraft engines, and the like, ceramic matrix composites (CMCs) have drawn attention since the specific gravities of the ceramic matrix composites are equal to or less than one third of those of heat-resistant metal materials such as Ni alloys, and the ceramic matrix composites are excellent in heat resistance. Melt infiltration is one of ceramic matrix composite manufacturing methods, and forms a matrix by infiltrating molten silicon. Melt infiltration makes it possible to manufacture a dense ceramic matrix composite by processing the matrix for a short time.

Japanese Patent Application Publication No. Hei 10-59780 (Patent Literature 1) discloses a ceramic matrix composite including a matrix with a silicon carbide main phase which is formed by infiltrating carbon powder into a preform containing fiber bundles of ceramic fibers, thereafter infiltrating molten silicon into the preform, and reactively sintering the resultant preform.

SUMMARY

However, in the case where the matrix is formed by the carbon powder infiltration, the subsequent molten silicon infiltration and the reactive sintering in manufacturing the ceramic matrix composite, unreacted carbon powder is likely to remain in the matrix. If such carbon powder remains in the matrix, the carbon is oxidized to form gas which is a combination of carbon and oxygen (CO and the like), and there is a case where the oxidation resistance of the ceramic matrix composite deteriorates.

With the above taken into consideration, an object of the present disclosure is to provide a ceramic matrix composite whose oxidation resistance can be further improved, and a method of manufacturing the same.

A ceramic matrix composite according to an embodiment of the present disclosure includes a substrate which contains a fibrous body made of silicon carbide fiber, and a matrix which is formed in the substrate, and which contains silicon carbide and a silicon material made of silicon or a binary silicon alloy.

In the ceramic matrix composite according to an embodiment of the present disclosure, the matrix contains no elemental carbon.

In the ceramic matrix composite according to an embodiment of the present disclosure, the silicon carbide fiber is amorphous silicon carbide fiber, and the silicon material is a binary silicon alloy.

In the ceramic matrix composite according to an embodiment of the present disclosure, the binary silicon alloy is a Si—Y alloy, a Si—Ti alloy or a Si—Hf alloy.

A method of manufacturing a ceramic matrix composite according to an embodiment of the present disclosure includes a powder infiltration step of infiltrating silicon carbide powder containing no elemental carbon into a substrate which contains a fibrous body made of silicon carbide fiber, and a melt infiltration step of infiltrating a silicon material made of silicon or a binary silicon alloy into the substrate, into which the silicon carbide powder has been infiltrated, by melting the silicon material through thermal treatment at a temperature equal to or higher than a melting point of the silicon material.

In the method of manufacturing a ceramic matrix composite according to an embodiment of the present disclosure, the silicon carbide fiber is amorphous silicon carbide fiber, and in the melt infiltrating step, the silicon material is a binary silicon alloy, and the binary silicon alloy is thermally treated at a temperature equal to or higher than the melting point of the silicon material, but lower than a thermal degradation temperature of the amorphous silicon carbide fiber.

In the method of manufacturing a ceramic matrix composite according to an embodiment of the present disclosure, the binary silicon alloy is a Si—Y alloy, a Si—Ti alloy of a Si—Hf alloy.

The foregoing configuration makes the matrix of the ceramic matrix composite contain no elemental carbon, and can accordingly improve the oxidation resistance of the ceramic matrix composite.

DESCRIPTION OF EMBODIMENTS

Figure 1:
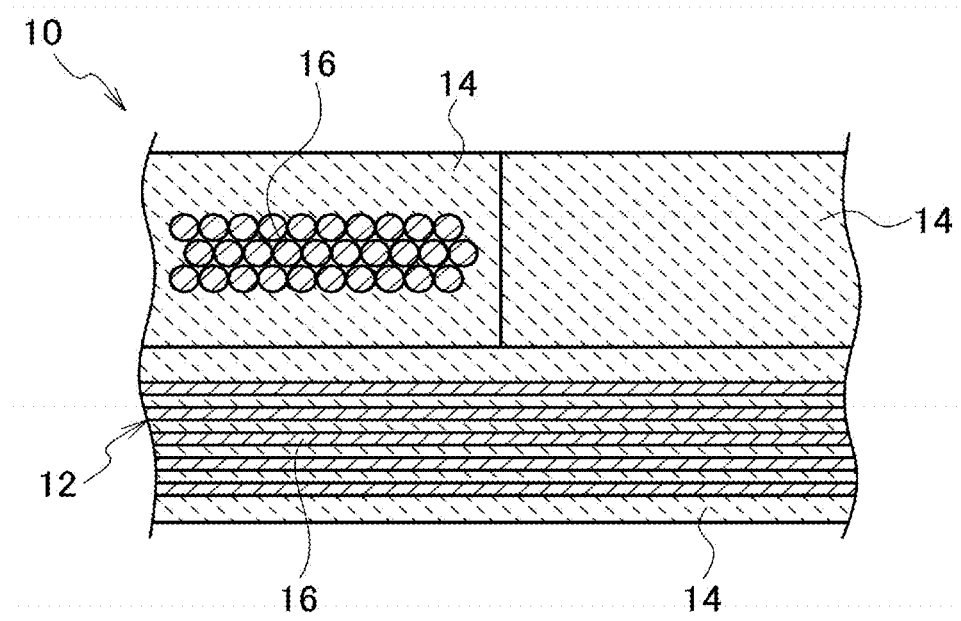
FIG. 1 is a schematic cross-sectional diagram illustrating a configuration of a ceramic matrix composite according to an embodiment of the present disclosure.

Referring to the drawings, detailed descriptions will be hereinbelow provided for an embodiment of the present disclosure. FIG. 1 is a schematic cross-sectional diagram illustrating a configuration of a ceramic matrix composite 10. The ceramic matrix composite 10 includes a substrate 12 which includes fibrous bodies made of silicon carbide fiber, and a matrix 14 formed in the substrate 12. The ceramic matrix composite 10 can be used, for example, for gas turbine components such as a jet engine turbine blade, high-temperature components such as a rocket engine thruster, and the like.

The substrate 12 includes fibrous bodies 16 made of silicon carbide fiber (SiC fiber), and has a function of reinforcing the ceramic matrix composite 10. Crystalline silicon carbide fiber and amorphous silicon carbide fiber are usable as the silicon carbide fiber. Crystalline silicon carbide fiber is better in heat resistance than amorphous silicon carbide fiber, and can improve the heat resistance of the ceramic matrix composite 10. The silicon carbide fiber is usable, for example, in the form of continuous fiber, discontinuous fiber, whisker and the like.

For example, three-dimensional fiber woven fabric having a three-dimensional structure which is obtained by weaving fiber bundles of hundreds to thousands of silicon carbide fiber filaments in the XYZ directions is usable as the fibrous bodies 16. Otherwise, two-dimensional fiber woven fabric and the like having a two-dimensional structure which is obtained by weaving fiber bundles of hundreds to thousands of silicon carbide fiber filaments using plain-weaving, satin-weaving or other weaving techniques is usable as the fibrous bodies 16.

The silicon carbide fiber of each fibrous body 16 may be coated with an interface layer. The interface layer has a function of inhibiting the propagation of cracks and the like from the matrix 14 to the silicon carbide fiber. The interface layer may be made of boron nitride (BN) with excellent oxidation resistance or the like. The thickness of the interface layer may be, for example, 0.1 µm or more and 0.5 µm or less.

In the substrate 12, silicon carbide layers may be provided in pores between the silicon carbide fibers of the fibrous bodies 16. The silicon carbide layer is capable of protecting the interface layers coating the silicon carbide fibers.

The matrix 14 is formed in the substrate 12. The matrix 14 contains silicon carbide, and a silicon material made of silicon or a binary silicon alloy, but no elemental carbon. The matrix 14 has a function of supporting the substrate 12. The matrix 14 is formed in pores and the like in the substrate 12. To put it more specifically, the matrix 14 is formed, for example, in pores between fiber bundles, pores between fibers, and the like.

The matrix 14 contains silicon carbide. The silicon carbide contained in the matrix 14 improves chemical stability between the silicon carbide fibers and the matrix 14, and inhibits the occurrence of cracks and the like due to the thermal expansion difference. Furthermore, the silicon carbide is excellent in oxidation resistance, and can improve the oxidation resistance of the ceramic matrix composite 10. The silicon carbide is formed in a particle shape.

The matrix 14 contains the silicon material made of silicon or a binary silicon alloy. The silicon material is formed in gaps between the silicon carbide particles or the like. The silicon material has a function of making the matrix 14 dense. In addition, the silicon material contains silicon, and is excellent in oxidation resistance. The silicon material, therefore, can improve the oxidation resistance of the ceramic matrix composite 10.

In the case where the silicon material is made of silicon, the silicon material can improve the heat resistance of the ceramic matrix resistance 10 since the melting point (approximately 1414° C.) of silicon is high.

In the case where the silicon material is made of a binary silicon alloy, the silicon material makes it possible to lower the thermal treatment temperature in the melt infiltration step (discussed later) since the melting point of the binary silicon alloy can be made lower than that of silicon. Even in a case where amorphous silicon carbide fibers are used, this makes it possible to inhibit thermal degradation in the amorphous silicon carbide fibers (grain coarsening, thermal decomposition, and the like). The binary silicon alloy may be a Si—Y (Yttrium) alloy, a Si—Ti (titanium) alloy or a Si—Hf (hafnium) alloy with excellent oxidation resistance.

The Si—Y alloy may be an alloy which contains 8 at % or more and 18 at % or less of Y, and whose rest is Si and inevitable impurities. In the case where the content of Y is 8 at % or more and 18 at % or less, the melting point of the Si—Y alloy is equal to or close to the eutectic temperature, and is accordingly lower than the melting-point of elemental silicon. In addition, in the case where the content of Y is 8 at % or more and 18 at % or less, the content of silicon contained in the Si—Y alloy is large, and the thermal expansion difference between the matrix 14 and the silicon carbide fibers is smaller than otherwise. Accordingly this content makes it possible to inhibit the occurrence of cracks and the like. In the case where the content of Y is 8 at % or more and 18 at % or less, the Si—Y alloy includes, for example, Si phases and $YSi_2$ phases.

The Si—Ti alloy may be an alloy which contains 8 at % or more and 18 at % or less of Ti, and whose rest is Si and inevitable impurities. In the case where the content of Ti is 8 at % or more and 18 at % or less, the melting point of the Si—Ti alloy is equal to or close to the eutectic temperature, and is accordingly lower than the melting point of elemental silicon. In addition, in the case where the content of Ti is 8 at % or more and 18 at % or less, the content of silicon contained in the Si—Ti alloy is large, and the thermal expansion difference between the matrix 14 and the silicon carbide fibers is smaller than otherwise. Accordingly this content makes it possible to inhibit the occurrence of cracks and the like. In the case where the content of Ti is 8 at % or more and 18 at % or less, the Si—Ti alloy includes, for example, Si phases and $TiSi_2$ phases.

The Si—Hf alloy may be an alloy which contains 5 at % or more and 12 at % or less of Hf, and whose rest is Si and inevitable impurities. In the case where the content of Hf is 5 at % or more and 12 at % or less, the melting point of the Si—Hf alloy is equal to or close to the eutectic temperature, and is accordingly lower than the melting point of elemental silicon. In addition, in the case where the content of Hf is 5 at % or more and 12 at % or less, the content of silicon contained in the Si—Hf alloy is large, and the thermal expansion difference between the matrix 14 and the silicon carbide fibers is smaller than otherwise. Accordingly this content makes it possible to inhibit the occurrence of cracks and the like. In the case where the content of Hf is 5 at % or more and 12 at % or less, the Si—Hf alloy includes, for example, Si phases and $HfSi_2$ phases.

The matrix 14 is formed without containing elemental carbon. "Without containing elemental carbon" means not actively making the matrix 14 contain elemental carbon while the ceramic matrix composite 10 is being manufactured. In a case where the matrix 14 contains elemental carbon such as residual carbon, carbon powder and the like caused while the ceramic matrix composite 10 is being manufactured, the oxidation resistance of the ceramic matrix composite 10 deteriorates when exposed to heat of approximately 600° C. or higher in the atmosphere because elemental carbon is oxidized to form gas which is a combination of carbon and oxygen (CO and the like). In a case where the matrix 14 contains no elemental carbon, no such elemental carbon oxidation occurs, and the oxidation resistance of the ceramic matrix composite 10 improves. The matrix 14 may be made of silicon carbide, and the silicon material made of silicon or a binary silicon alloy, without containing elemental carbon.

Figure 2:
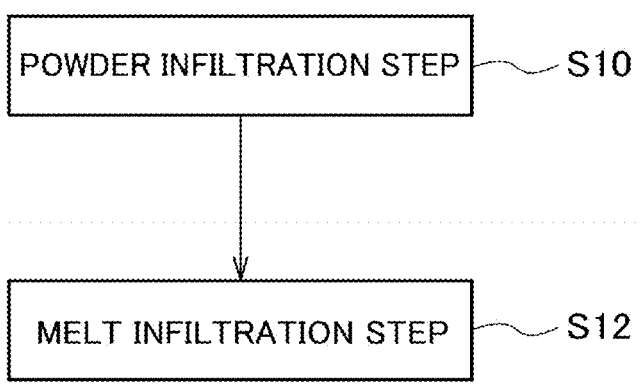
FIG. 2 is a flowchart illustrating a configuration of a method of manufacturing a ceramic matrix composite according to the embodiment of the present disclosure.

Next, descriptions will be provided for a method of manufacturing the ceramic matrix composite 10. FIG. 2 is a flowchart illustrating a configuration of the method of manufacturing the ceramic matrix composite 10. The method of manufacturing the ceramic matrix composite 10 includes a powder infiltration step (S10) and a melt infiltration step (S12).

The powder infiltration step (S10) is a step of infiltrating silicon carbide powder containing no elemental carbon into the substrate 12 which contains the fibrous bodies 16 made of the silicon carbide fiber.

To begin with, the substrate 12 will be described. The fibrous bodies 16 contained in the substrate 12 are made of silicon carbide fiber, and includes a preform of three-dimensionally fiber woven fabric or the like. Crystalline silicon carbide fiber and amorphous silicon carbide fiber may be used as the silicon carbide fiber.

For example, Hi-Nicalon™ Type S (Nippon Carbon Co. Ltd), Tyranno Fiber™ SA-Grade (Ube Industries, Ltd.) or the like may be used as the crystalline silicon carbide fiber. The crystalline silicon carbide fiber is better in heat resistance than the amorphous silicon carbide fiber, and can improve the heat resistance of the ceramic matrix composite 10.

For example, Hi-Nicalon™ (Nippon Carbon Co. Ltd), Tyranno Fiber™ ZMI-Grade (Ube Industries, Ltd.) or the like may be used as the amorphous silicon carbide fiber. The amorphous silicon carbide fiber has a lower elastic modulus than the crystalline silicon carbide fiber, and has a larger fracture strain. The amorphous silicon carbide fiber, therefore, makes the fibrous bodies 16 easier to form. Furthermore, the amorphous silicon carbide fiber is more inexpensive than the crystalline silicon carbide fiber, and makes it possible to reduce manufacturing costs of the ceramic matrix composite 10.

The silicon carbide fiber of each fibrous body 16 may be coated with the interface layer made of boron nitride (BN) or the like. The coating of the silicon carbide fiber with the interface layer may be achieved by chemical vapor deposition (CVD).

In the substrate 12, silicon carbide layers may be formed in pores between the fibers of the fibrous bodies 16 by chemical vapor infiltration (CVI) before the powder infiltration step (S10). The silicon carbide layers can be formed in pores between the fibers of the fibrous bodies 16, for example, by setting the fibrous bodies 16 in a reactor, heating the fibrous bodies 16 (at a reaction temperature of 900° C. to 1000° C.), and using methyltrichlorosilane ($CH_3SiCl_3$) as the reaction gas. The silicon carbide layers are each made in the form of a dense film by chemical vapor infiltration, and can protect the interface layers.

Next, descriptions will be provided for a powder infiltration method. First of all, slurry for infiltrating the silicon carbide powder containing no elemental carbon is produced. The slurry includes the silicon carbide powder and a solvent. Silicon carbide powder containing no elemental carbon such as carbon powder is used as the silicon carbide powder. This makes it possible to prevent the matrix 14 from containing elemental carbon.

The average particle diameter of the silicon carbide powder may be 1 µm or more and 10 µm or less. This is because if the average particle diameter of the silicon carbide powder is less than 1 µm, silicon carbide particles aggregate to decrease the infiltration property of the silicon carbide powder. This is also because if the average particle diameter of the silicon carbide powder is greater than 10 µm, the silicon carbide powder's property of being filled into the substrate 12 is worsened. The particle size of the silicon carbide powder can be adjusted by classification using a sieve. The particle diameters and the particle size distribution of the silicon carbide powder can be measured using a general measurement method such as a laser diffraction scattering method.

The content of the silicon carbide powder in the slurry may be 30 volume % or more and 70 volume % or less. This is because if the content of the silicon carbide power is less than 30 volume %, the silicon carbide powder's property of being filled into the substrate 12 is worsened. This is also because if the content of the silicon carbide is greater than 70 volume %, the viscosity of the slurry is too large, and decreases the infiltration property of the silicon carbide powder. The content of the silicon carbide powder may be 40 volume % or more and 60 volume % or less. A commercially available product may be used as the silicon carbide powder.

Any solvent may be used as long as the solvent is capable of dispersing the silicon carbide powder. For example, ethanol, methanol, butanol, acetone, xylene, water and the like may be used as the solvent. A commercially available product may be used as the solvent.

The slurry is produced by mixing the silicon carbide powder containing no elemental carbon and the solvent together using a mixer or the like. The slurry may include a binder. For example, silica sol such as colloidal silica may be uses as the binder.

The substrate 12 and the slurry are put into a container, and the substrate 12 is dipped into the slurry. Thereby, the slurry is infiltrated into the substrate 12. The inside of the container may be vacuumed using a vacuum pump or the like before or while the substrate 12 is dipped into the slurry. The removal of air and the like from pores in the substrate 12 by the vacuuming makes it easier to infiltrate the slurry into the substrate 12.

For the purpose of facilitating the infiltration of the slurry into the substrate 12, ultrasonic vibration may be applied to the substrate 12 and the slurry using an ultrasonic vibrator or the like (so-called wet vibration application infiltration) while the substrate 12 is dipped in the slurry. The vibration frequency may be, for example, in a range of 50 Hz to 30 kHz. A length of time for which the ultrasonic vibration is applied may be, for example, in a range of 10 minutes to 30 minutes.

Thereafter, the substrate 12 into which the slurry has been infiltrated is dried. The substrate 12 into which the slurry has been infiltrated is dried by being heated using a drier or the like. Thereby, the solvent is removed from the slurry, and the silicon carbide powder remains in the substrate 12. The drying temperature may be, for example, in a range of 80° C. to 100° C. The drying length of time may be, for example, in a range of one hour to three hours.

Figure 3:
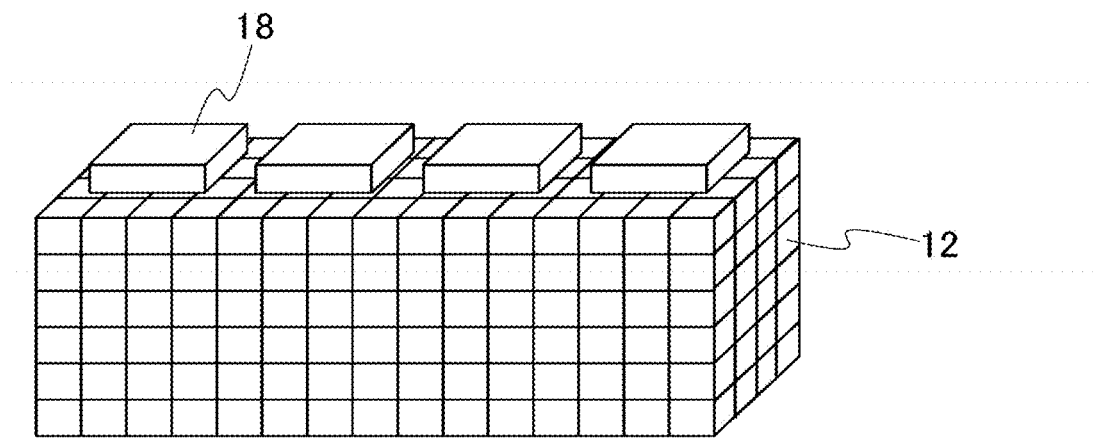
FIG. 3 is a diagram for explaining how a melt infiltration step is performed in the embodiment of the present disclosure.

The melt infiltration step (S12) is a step of infiltrating the silicon material made of silicon or the binary silicon alloy into the substrate 12, into which the silicon carbide powder containing no elemental carbon has been infiltrated, by melting the silicon material through thermal treatment at a temperature equal to or higher than the melting point of the silicon material. FIG. 3 is a diagram for explaining how the melt infiltration step (S12) is performed.

As illustrated in FIG. 3, ingots or the like of the silicon material 18 made of silicon or the binary silicon alloy are disposed on the substrate 12 into which the silicon carbide powder containing no elemental carbon has been infiltrated. The ingots can be formed by arc melting or the like. The binary silicon alloy may be the Si—Y alloy, the Si—Ti alloy or the Si—Hf alloy with excellent oxidation resistance.

The Si—Y alloy may be the alloy which contains 8 at % or more and 18 at % or less of Y, and whose rest is Si and inevitable impurities. In the case where the content of Y in the Si—Y alloy is 8 at % or more and 18 at % or less, the melting point of the Si—Y alloy can be made lower than the melting point of silicon.

The Si—Ti alloy may be the alloy which contains 8 at % or more and 18 at % or less of Ti, and whose rest is Si and inevitable impurities. In the case where the content of Ti in the Si—Ti alloy is 8 at % or more and 18 at % or less, the melting point of the Si—Ti alloy can be made lower than the melting point of silicon.

The Si—Hf alloy may be the alloy which contains 5 at % or more and 12 at % or less of Hf, and whose rest is Si and inevitable impurities. In the case where the content of Hf in the Si—Hf alloy is 5 at % or more and 12 at % or less, the melting point of the Si—Hf alloy can be made lower than the melting point of silicon.

The ingots of the silicon material 18 are thermally treated after the ingots are disposed on the substrate 12 into which the silicon carbide powder containing no elemental carbon has been infiltrated. The thermal treatment is performed by heating at a thermal treatment temperature equal to or higher than the melting point of the silicon material 18 for the purpose of melting the silicon material 18.

In the case where the silicon material 18 is made of silicon, the thermal treatment is performed by heating at a thermal treatment temperature equal to or higher than the melting point (approximately 1414° C.) of silicon. The thermal treatment temperature may be, for example, approximately 1450° C.

In the case where the silicon material 18 is made of the binary silicon alloy, the thermal treatment is performed by heating at a temperature equal to or higher than the melting point of the binary silicon alloy. Since the melting point of the binary silicon alloy can be made lower than that of silicon, the thermal treatment temperature can be lowered. Thus, even in the case where amorphous silicon carbide fiber is used, the thermal treatment temperature can be lowered. This lower thermal treatment temperature inhibits the thermal degradation caused by the coarsening of the grains, thermal decomposition and the like of the amorphous silicon carbide fiber, and therefore inhibits a decrease in the mechanical strength of the ceramic matrix composite 10. Furthermore, since the thermal treatment temperature can be lowered, the productivity can be improved, and the manufacturing costs can be reduced. The thermal treatment temperature may be equal to or higher than the melting point of the binary silicon alloy, but lower than the thermal degradation temperature of the amorphous silicon carbide fiber. The thermal degradation temperature of the amorphous silicon carbide fiber may be equal to a temperature at which the grains of the amorphous silicon carbide fiber coarsens and thermally decomposes.

The thermal treatment time period may be set in a range from approximate 10 minutes to 1 hour at the thermal treatment temperature. The thermal treatment atmosphere may be the vacuum atmosphere, or an inert gas atmosphere using an argon gas or the like in order to inhibit the oxidation. From a viewpoint of facilitation of the infiltration, the thermal treatment atmosphere may be the vacuum atmosphere. As for the thermal treatment facility, a general vacuum thermal treatment furnace, a general atmospheric thermal treatment furnace or the like, which is used to thermally treat metallic materials, may be used. The thermal treatment is performed at the thermal treatment temperature for the predetermined length of time. The cooling following the thermal treatment is performed to room temperature.

The molten silicon material 18 penetrates into gaps and the like between the silicon carbide particles, and is thereby infiltrated into the gaps and the like between the silicon carbide particles. Since the silicon carbide powder does not contain elemental carbon such as carbon powder, the molten silicon material 18 is densely infiltrated into the gaps between the silicon carbide particles up to the inside of the substrate 12. To put it specifically, in the case where the silicon carbide powder contains elemental carbon, the molten silicon material 18 reacts with elemental carbon on the surface of the substrate 12, and forms silicon carbide. The thus-formed silicon carbide blocks the infiltration channels which are formed from the gaps between the silicon carbide particles, and inhibits the penetration of the molten silicon material 18 into the inside of the substrate 12. In contrast to this, in the case where the silicon carbide powder contains no elemental carbon, almost no reaction occurs between the silicon carbide powder and the molten silicon material 18. Thus, the infiltration channels to the inside of the substrate 12 can be secured, and the molten silicon material 18 can penetrate into the inside of the substrate 12. The molten silicon material 18 is densely infiltrated into the gaps between the silicon carbide particles up to the inside of the substrate 12, and inhibits the occurrence of non-infiltrated portions. Thereby, the matrix 14 made of silicon carbide particles containing no elemental carbon, and the silicon material 18 filled in the gaps between the silicon carbide particles is densely formed in the pores, voids and the like in the substrate 12. Since the matrix 14 is densely formed, the Young's modulus of the matrix 14 can be made substantially equal to that of silicon carbide continuous fiber.

It should be noted that after the melt infiltration step (S12), the method of manufacturing the ceramic matrix composite 10 may be provided with a polymer impregnation and pyrolysis step of forming silicon carbide by impregnating the substrate 12 with a polymer material for forming the silicon carbide, and pyrolyzing the polymer material.

As discussed above, according to the foregoing configuration, the ceramic matrix composite includes the substrate which contains the fibrous bodies made of the silicon carbide fiber, and the matrix which is formed in the substrate, and which contains silicon carbide and the silicon material made of silicon or the binary silicon alloy, but no elemental carbon. Since the matrix contains no elemental carbon, the oxidation resistance of the ceramic matrix composite is improved.

According to the foregoing configuration, the method of manufacturing the ceramic matrix composite includes the powder infiltration step of infiltrating the silicon carbide powder containing no elemental carbon into the substrate which contains the fibrous bodies made of the silicon carbide fiber, and the melt infiltration step of infiltrating the silicon material made of silicon or the binary silicon alloy into the substrate, into which the silicon carbide powder containing no elemental carbon has been infiltrated, by melting the silicon material through the thermal treatment at a temperature equal to or higher than the melting point of the silicon material. Since the matrix contains no elemental carbon, the oxidation resistance of the ceramic matrix composite is improved. In addition, the use of the silicon carbide powder containing no elemental carbon makes it possible to enhance the molten silicon material's infiltration property, and to form the dense matrix.

EXAMPLES

A matrix formation test was performed on the ceramic matrix composite.

To begin with, descriptions will be provided for Example 1. Slurry was produced by mixing SiC powder containing no elemental carbon such as carbon powder with ethanol. SiC powder with an average particle diameter of 1 μm or more and 10 μm or less was used as the SiC powder. The slurry was poured into a rectangular mold, and was subsequently dried. Thereby, a rectangular SiC powder compact was formed.

Figure 4:
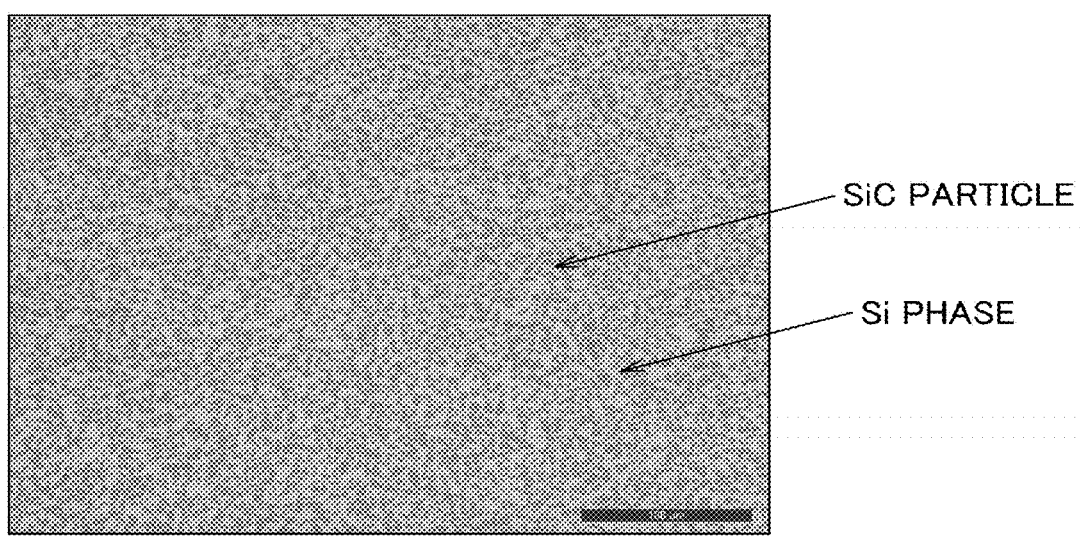
FIG. 4 is a photograph showing a result of observing a cross section of a specimen of Example 1 in the embodiment of the present disclosure.

Si was melted and infiltrated into the SiC powder compact. Ingots of Si were disposed on the SiC powder compact. The ingots were formed by arc melting. The SiC powder compact with the ingots disposed thereon was put into a thermal treatment furnace, and was thermally treated in the vacuum atmosphere at a thermal treatment temperature of 1450° C. for a holding time of 20 minutes. Through this thermal treatment, the ingots were melted, and Si was melted and infiltrated into the SiC powder compact. The specimen of Example 1 was observed with an optical microscope. FIG. 4 is a photograph showing a result of observing a cross section of the specimen of Example 1. In the specimen of Example 1, the molten Si penetrated into gaps between SiC particles, and the matrix was integrally densely formed.

Next, descriptions will be provided for Example 2. A silicon material to be melted and infiltrated in Example 2 was different from that to be melted and infiltrated in Example 1, but Example 2 used the same SiC powder compact as used in Example 1. In Example 2, a Si—Y alloy was melted and infiltrated into the SiC powder compact. A Si-10 at % Y alloy which contained 10 at % of Y, and whose rest was Si and inevitable impurities, was used as the Si—Y alloy. Ingots of the Si—Y alloy were formed by arc melting. The ingots were disposed on the SiC powder compact. The SiC powder compact with the ingots disposed thereon was put into the thermal treatment furnace, and was thermally treated in the vacuum atmosphere at a thermal treatment temperature of 1380° C. for a holding time of 20 minutes. Through this thermal treatment, the ingots were melted, and the Si—Y was thus melted and infiltrated into the SiC powder compact.

An oxidation test was performed on the specimen of Example 2, and the oxidation resistance of the specimen was evaluated. Furthermore, the oxidation test was similarly performed on a specimen Comparative Example 1 made of the Si-10 at % Y alloy. The oxidation test was performed in the atmosphere at an exposure temperature of 1100° C. for an exposure time of 100 hours. After the oxidation test, cross-sections of the respective specimens were observed with the optical microscope.

Figure 5:
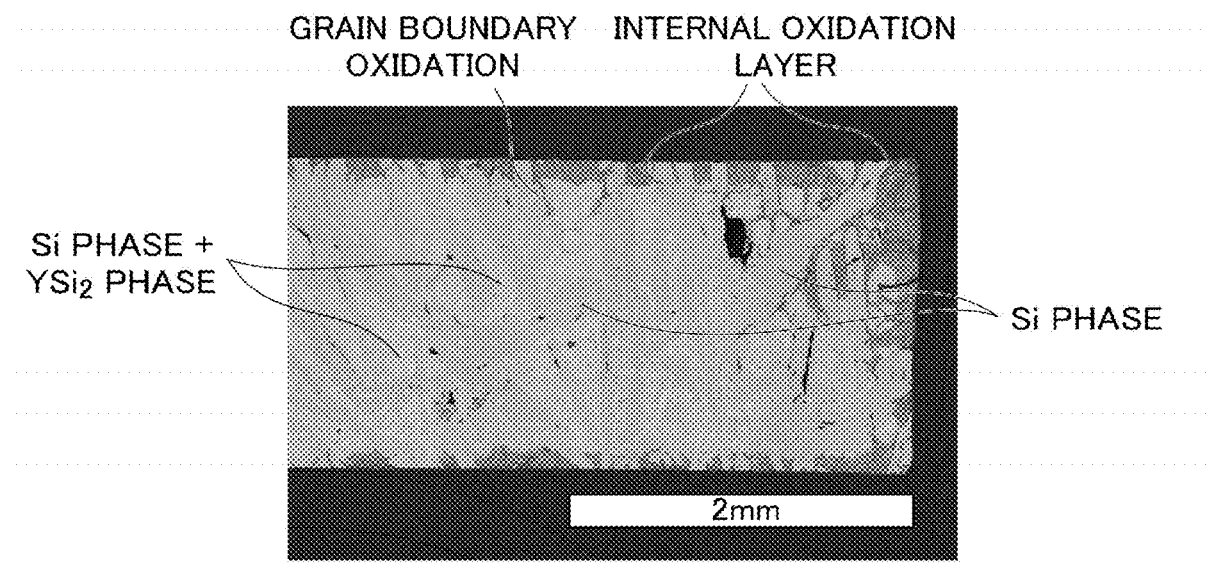
FIG. 5 is a photograph showing a result of observing a cross section of the specimen of Comparative Example 1 after an oxidation test in the embodiment of the present disclosure.

FIG. 5 is a photograph showing a result of observing the cross-section of the specimen of Comparative Example 1 after the oxidation test. As shown in FIG. 5, it was observed that the specimen of Comparative Example 1 included Si phases and $YSi_2$ phases, and the $YSi_2$ phases and grain boundaries were preferentially oxidized.

Figure 6:
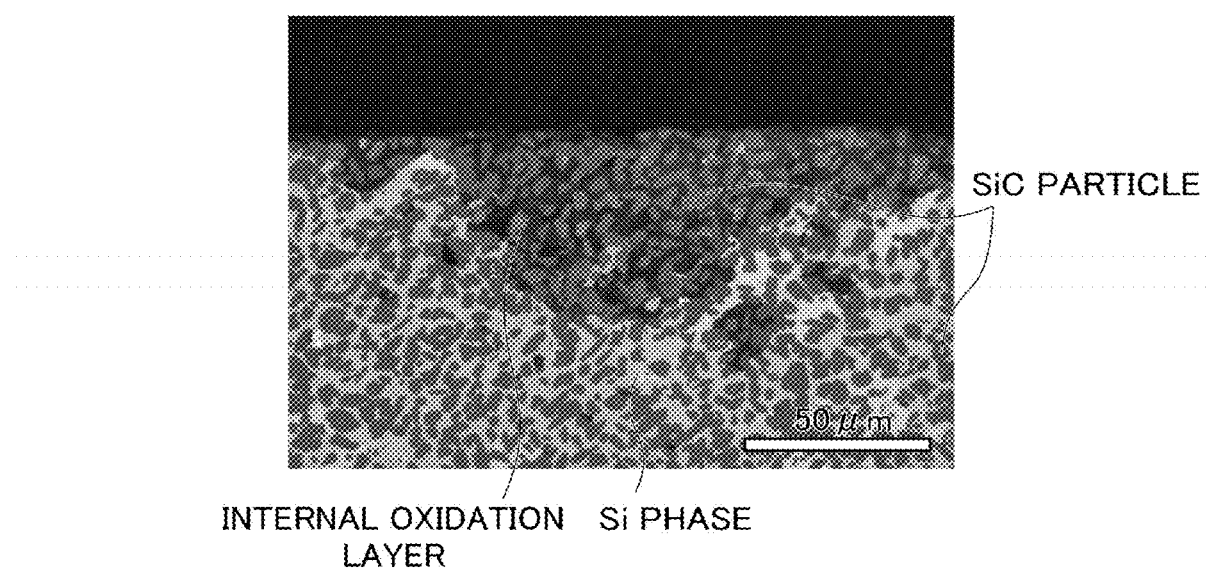
FIG. 6 is a photograph showing a result of observing a cross section of a specimen of Example 2 after an oxidation test in the embodiment of the present disclosure.

FIG. 6 is a photograph showing a result of observing the cross-section of the specimen of Example 2 after the oxidation test. In the specimen of Example 2, the molten Si—Y alloy penetrated into gaps between SiC particles, and the matrix was integrally densely formed. Mainly Si phases were formed in the gaps between the SiC particles, and fine $YSi_2$ phases were dispersed in between. Internal oxidation less occurred in the specimen of Example 2 than in the specimen of Comparative Example 1, and the specimen of Example 2 was better in oxidation resistance than the specimen of Comparative Example 1. One may consider that this is because less of the $YSi_2$ phases were exposed to the surface of the specimen, and the grain boundary density was small enough to inhibit the diffusion of oxygen.

Figure 7:
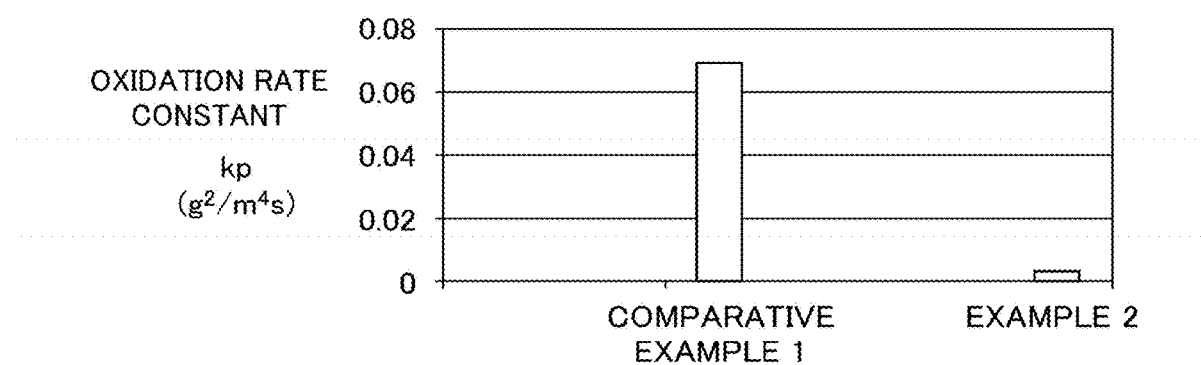
FIG. 7 is a graph showing an oxidation rate constant kp in the atmosphere in the embodiment of the present disclosure.

Oxidation rate constants were calculated based on increases in the respective oxidation weights in the atmosphere. FIG. 7 is a graph illustrating the oxidation rate constants kp in the atmosphere. In FIG. 7, the vertical axis represents the oxidation rate constants kp, and the lengths of the bars are respectively proportional to the values of the oxidation rate constants kp. The graph of FIG. 7 shows that the oxidation rate constant of the specimen of Example 2 was smaller than that of the specimen of Comparative Example 1, and the specimen of Example 2 was better in oxidation resistance than the specimen of Comparative Example 1.

Figure 8:
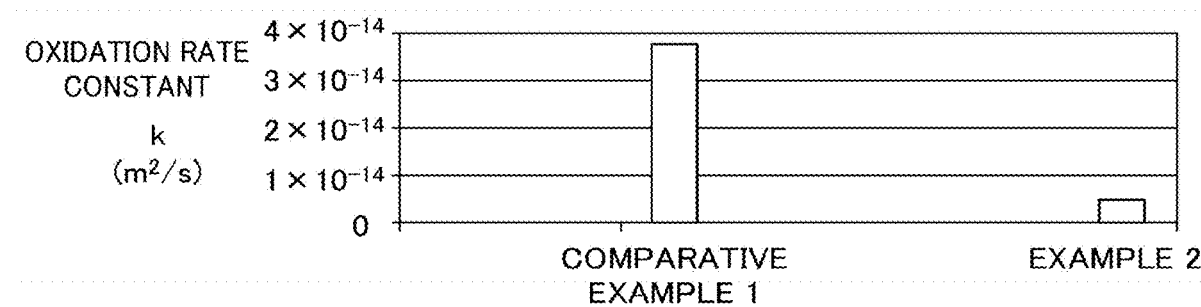
FIG. 8 is a graph showing an oxidation rate constant k in an oxidizing atmosphere containing water vapor in the embodiment of the present disclosure.

Thereafter, a water vapor oxidation test was performed. The water vapor oxidation test was performed in an oxidizing atmosphere containing water vapor at an exposure temperature of 1100° C. for an exposure time of 100 hours. Oxidation rate constants were calculated based on the film thicknesses of the respective oxide films. FIG. 8 is a graph showing the oxidation rate constants k in the oxidizing atmosphere containing water vapor. In FIG. 8, the vertical axis represents the oxidation rate constants k, and the lengths of the bars are respectively proportional to the values of the oxidation rate constants k. The graph of FIG. 8 shows that the oxidation rate constant of the specimen of Example 2 was smaller than that of the specimen of Comparative Example 1, and the specimen of Example 2 was better in water vapor oxidation resistance than the specimen of Comparative Example 1.

Figure 9:
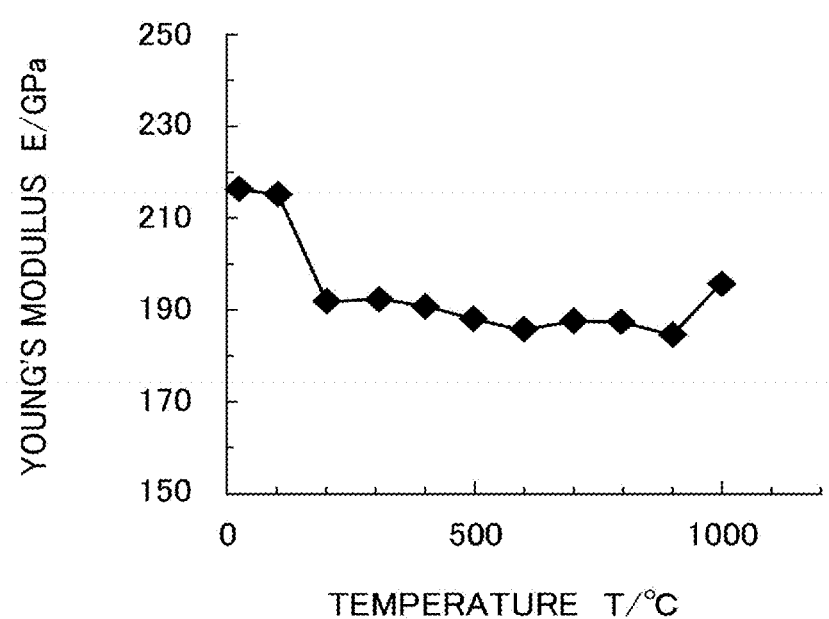
FIG. 9 is a graph showing a result of measuring a Young's modulus in the embodiment of the present disclosure.

Thereafter, the Young's modulus of the specimen of Example 2 was measured. The Young's modulus was measured by a resonance method in the atmosphere in a temperature range of room temperature to 1000° C. FIG. 9 is a graph showing results of measuring the Young's modulus. In FIG. 9, the horizontal axis represents temperature, while the vertical axis represents the Young's modulus. Black diamonds in FIG. 9 correspond to Young's moduli at the respective temperatures. It became clear that in the environment in the temperature range of room temperature to 1000° C., the Young's modulus of the specimen of Example 2 was substantially equal to that of the SiC continuous fiber.

The present disclosure is effective for gas turbine components such as a jet engine turbine blade, high-temperature components such as a rocket engine thruster, and the like since the matrix in the ceramic matrix composite contains no elemental carbon and is accordingly capable of improving the oxidation resistance of the ceramic matrix composite.

What is claimed is:
1. A ceramic matrix composite comprising:
   a substrate which contains a fibrous body made of silicon carbide fiber; and a matrix which is formed in the substrate, and which contains silicon carbide and a silicon material made of silicon or a binary silicon alloy,
wherein the substrate and the matrix contain no elemental carbon.

2. The ceramic matrix composite according to claim 1, wherein the silicon carbide fiber is amorphous silicon carbide fiber, and the silicon material is a binary silicon alloy.

3. The ceramic matrix composite according to claim 1, wherein the binary silicon alloy is a Si—Y alloy, a Si—Ti alloy or a Si—Hf alloy.

4. The ceramic matrix composite according to claim 2, wherein the binary silicon alloy is a Si—Y alloy, a Si—Ti alloy or a Si—Hf alloy.

5. The ceramic matrix composite according to claim 1, wherein the matrix contains no reaction bonded silicon carbide.

6. A method of manufacturing a ceramic matrix composite, comprising:
a powder infiltration step of infiltrating silicon carbide powder containing no elemental carbon into a substrate which contains a fibrous body made of silicon carbide fiber; and
a melt infiltration step of infiltrating a silicon material made of silicon or a binary silicon alloy into the substrate, into which the silicon carbide powder has been infiltrated and which contains no elemental carbon, by melting the silicon material through thermal treatment at a temperature equal to or higher than a melting point of the silicon material, thereby forming a matrix.

7. The method of manufacturing a ceramic matrix composite according to claim 6, wherein
the silicon carbide fiber is amorphous silicon carbide fiber, and
in the melt infiltrating step, the silicon material is a binary silicon alloy, and the binary silicon alloy is thermally treated at a temperature equal to or higher than the melting point of the silicon material, but lower than a thermal degradation temperature of the amorphous silicon carbide fiber.

8. The method of manufacturing a ceramic matrix composite according to claim 6, wherein the binary silicon alloy is a Si—Y alloy, a Si—Ti alloy or a Si—Hf alloy.

9. The method of manufacturing a ceramic matrix composite according to claim 7, wherein the binary silicon alloy is a Si—Y alloy, a Si—Ti alloy or a Si—Hf alloy.

10. The method of manufacturing a ceramic matrix composite according to claim 6, wherein in the melt infiltration step, the matrix contains no reaction bonded silicon carbide.

11. The method of manufacturing a ceramic matrix composite according to claim 6, wherein in the melt infiltration step, an ingot of the silicon material is disposed on the substrate and infiltrated.

* * * * *